(12) United States Patent
Chigurupati

(10) Patent No.: US 9,247,762 B1
(45) Date of Patent: Feb. 2, 2016

(54) SALT SUBSTITUTE WITH PLANT TISSUE CARRIER

(71) Applicant: S & P INGREDIENT DEVELOPMENT, LLC, Minnetonka, MN (US)

(72) Inventor: Sambasiva Rao Chigurupati, Omaha, NE (US)

(73) Assignee: S & P INGREDIENT DEVELOPMENT, LLC, Minnetonka, MN (US)

(*) Notice: Subject to any disclaimer, the term of this patent is extended or adjusted under 35 U.S.C. 154(b) by 0 days.

(21) Appl. No.: 14/481,481

(22) Filed: Sep. 9, 2014

(51) Int. Cl.
  *A23L 1/22* (2006.01)
  *A23L 1/237* (2006.01)

(52) U.S. Cl.
  CPC .................................. *A23L 1/2375* (2013.01)

(58) Field of Classification Search
  CPC ......... A23L 1/237; A23L 1/2375; A23L 2/14; A23L 2/218; A23L 1/22; C01D 3/04
  USPC .......................... 426/649, 455, 456, 473, 615
  See application file for complete search history.

(56) References Cited

U.S. PATENT DOCUMENTS

| | | |
|---|---|---|
| 1,874,055 A | 8/1932 | Liebrecht |
| 1,978,040 A | 10/1934 | Werner |
| 2,500,919 A | 3/1950 | Cahn et al. |
| 2,596,333 A | 5/1952 | Halpern et al. |
| 2,601,112 A | 6/1952 | Louis |
| 2,742,366 A | 4/1956 | Power et al. |
| 2,824,008 A | 2/1958 | Perri et al. |
| 2,829,056 A | 4/1958 | Kemmerer |
| 2,874,027 A | 2/1959 | Gloss |
| 2,900,268 A | 8/1959 | Rankin et al. |
| 2,968,566 A | 1/1961 | Munch |
| 3,505,082 A | 4/1970 | Miller et al. |
| 3,514,296 A | 5/1970 | Frank et al. |
| 3,782,974 A | 1/1974 | Lontz |
| 3,860,732 A | 1/1975 | Eisenstadt |
| 4,066,799 A | 1/1978 | Cornelius et al. |
| 4,068,006 A | 1/1978 | Moritz |
| 4,076,846 A | 2/1978 | Nakatsuka et al. |
| 4,216,244 A | 8/1980 | Allen et al. |
| 4,243,691 A | 1/1981 | Mohlenkamp et al. |
| 4,293,535 A | 10/1981 | Arendt |
| 4,297,375 A | 10/1981 | Shackelford |

(Continued)

FOREIGN PATENT DOCUMENTS

| | | |
|---|---|---|
| CA | 1155330 A | 10/1983 |
| CN | 1559436 A | 1/2005 |

(Continued)

OTHER PUBLICATIONS

Cohen, English Abstract of AR011559, Aug. 30, 2000, 1 page.

(Continued)

*Primary Examiner* — Helen F Heggestad
(74) *Attorney, Agent, or Firm* — Fish & Richardson P.C.

(57) ABSTRACT

A salt substitute including an inorganic food-grade salt, an organic food-grade acid as an acidulant, and edible plant tissue. The inorganic food-grade salt and the organic food-grade acid are dispersed throughout the plant tissue. The inorganic food-grade salt may include sodium and non-sodium salts. The salt substitute is a particulate solid, and may include one or more additives.

19 Claims, 7 Drawing Sheets

(56) References Cited

U.S. PATENT DOCUMENTS

| | | | |
|---|---|---|---|
| 4,340,614 A | 7/1982 | Pich et al. | |
| 4,451,494 A | 5/1984 | Roan, III et al. | |
| 4,473,595 A | 9/1984 | Rood et al. | |
| 4,486,456 A | 12/1984 | Thompson | |
| 4,556,566 A | 12/1985 | Bell | |
| 4,556,567 A | 12/1985 | Meyer | |
| 4,556,568 A | 12/1985 | Meyer | |
| 4,556,577 A | 12/1985 | Meyer | |
| 4,556,578 A | 12/1985 | Meyer | |
| 4,560,574 A | 12/1985 | Meyer | |
| 4,734,290 A | 3/1988 | Meyer | |
| 4,748,027 A | 5/1988 | Schou et al. | |
| 4,798,736 A | 1/1989 | Belohlawek | |
| 4,873,108 A | 10/1989 | De Rooij et al. | |
| 4,915,962 A | 4/1990 | Howard | |
| 4,931,305 A | 6/1990 | Karppanen et al. | |
| 4,963,387 A | 10/1990 | Nakagawa et al. | |
| 5,034,378 A | 7/1991 | Cox | |
| 5,064,663 A | 11/1991 | Murray et al. | |
| 5,094,862 A | 3/1992 | Bunick et al. | |
| 5,098,723 A | 3/1992 | DuBois et al. | |
| 5,098,724 A | 3/1992 | DuBois et al. | |
| 5,106,632 A | 4/1992 | Wong et al. | |
| 5,173,323 A | 12/1992 | Omari | |
| 5,213,838 A | 5/1993 | Sheikh | |
| 5,288,510 A | 2/1994 | Gregory et al. | |
| 5,447,543 A | 9/1995 | Sadan | |
| 5,494,689 A | 2/1996 | Lee et al. | |
| 5,562,942 A | 10/1996 | Koh et al. | |
| 5,626,904 A | 5/1997 | Frederiksen | |
| 5,853,792 A * | 12/1998 | Zolotov et al. | 426/649 |
| 5,871,803 A | 2/1999 | Bonorden et al. | |
| 5,897,908 A | 4/1999 | Berglund et al. | |
| 6,013,298 A | 1/2000 | Takano et al. | |
| 6,030,535 A | 2/2000 | Hayashi et al. | |
| 6,048,569 A | 4/2000 | Garcia et al. | |
| 6,090,419 A | 7/2000 | Popplewell et al. | |
| 6,541,050 B1 | 4/2003 | Bonorden et al. | |
| 6,632,467 B1 | 10/2003 | Salvi | |
| 6,743,461 B1 | 6/2004 | Vasquez | |
| 6,753,023 B2 | 6/2004 | Hammond | |
| 6,783,788 B2 | 8/2004 | Kuroda et al. | |
| 6,787,169 B1 | 9/2004 | Maeki | |
| 6,926,918 B2 | 8/2005 | LeBlanc | |
| 7,208,189 B2 | 4/2007 | Ghosh et al. | |
| 7,402,328 B2 | 7/2008 | Vasquez | |
| 7,452,563 B2 | 11/2008 | Salemme et al. | |
| 7,455,872 B2 | 11/2008 | Salemme et al. | |
| 7,794,768 B2 | 9/2010 | Dewis et al. | |
| 7,820,225 B2 | 10/2010 | Zuniga et al. | |
| 7,854,956 B2 | 12/2010 | Flores Zuniga | |
| 7,867,520 B2 | 1/2011 | Ikeda et al. | |
| 7,989,016 B2 | 8/2011 | Chigurupati | |
| 8,197,878 B2 | 6/2012 | Chigurupati | |
| 8,231,924 B2 | 7/2012 | Ganesan et al. | |
| 8,231,925 B2 | 7/2012 | Ganesan et al. | |
| 8,329,236 B2 | 12/2012 | Chigurupati | |
| 8,372,463 B2 | 2/2013 | Flores Zuniga | |
| 8,409,653 B2 | 4/2013 | Shimono et al. | |
| 8,435,555 B2 | 5/2013 | Minter et al. | |
| 8,501,253 B2 | 8/2013 | Maeki et al. | |
| 8,802,181 B2 | 8/2014 | Grossbier et al. | |
| 8,932,661 B2 | 1/2015 | Shimono et al. | |
| 8,999,425 B2 | 4/2015 | Meyer | |
| 9,011,963 B2 | 4/2015 | Osterwalder et al. | |
| 2003/0008046 A1 | 1/2003 | Gerlat et al. | |
| 2003/0175202 A1 | 9/2003 | Mao | |
| 2005/0142219 A1 | 6/2005 | Dunuwila et al. | |
| 2006/0024422 A1 | 2/2006 | Bakal | |
| 2006/0115518 A1 | 6/2006 | Tsuchiya et al. | |
| 2007/0059428 A1 | 3/2007 | Chigurupati | |
| 2007/0184176 A1 | 8/2007 | Kuroda et al. | |
| 2007/0292592 A1 | 12/2007 | Zasypkin et al. | |
| 2008/0003339 A1 | 1/2008 | Johnson et al. | |
| 2008/0003344 A1 | 1/2008 | Jensen et al. | |
| 2008/0008790 A1 | 1/2008 | Jensen et al. | |
| 2008/0038411 A1 | 2/2008 | Jensen et al. | |
| 2008/0193591 A1 | 8/2008 | Wada et al. | |
| 2008/0199595 A1 | 8/2008 | Zasypkin et al. | |
| 2009/0041900 A1 | 2/2009 | Zuniga | |
| 2009/0047396 A1 | 2/2009 | Ikeda | |
| 2009/0104330 A1 | 4/2009 | Zasypkin | |
| 2009/0117254 A1 | 5/2009 | Chigurupati | |
| 2009/0155408 A1 | 6/2009 | Dupuy-Cornuaille et al. | |
| 2009/0169701 A1 | 7/2009 | Pfeiffer et al. | |
| 2009/0196957 A1 | 8/2009 | Vadlamani et al. | |
| 2010/0047391 A1 | 2/2010 | Meijer et al. | |
| 2010/0047398 A1 | 2/2010 | Vasquez | |
| 2010/0075017 A1 | 3/2010 | Nishimura et al. | |
| 2010/0227023 A1 | 9/2010 | Wassergord et al. | |
| 2010/0239740 A1 | 9/2010 | Meyer | |
| 2010/0303853 A1 | 12/2010 | Lejeune et al. | |
| 2011/0052785 A1 | 3/2011 | Zuñiga | |
| 2011/0098365 A1 * | 4/2011 | Minter et al. | 514/772.3 |
| 2011/0236543 A1 | 9/2011 | Chigurupati | |
| 2011/0244103 A1 | 10/2011 | Chigurupati | |
| 2012/0003358 A1 | 1/2012 | Vadlamani et al. | |
| 2012/0128830 A1 | 5/2012 | Chigurupati | |
| 2012/0164287 A1 | 6/2012 | Lundberg et al. | |
| 2012/0232166 A1 | 9/2012 | Finley et al. | |
| 2013/0196001 A1 | 8/2013 | Moore et al. | |
| 2013/0224361 A1 | 8/2013 | Miyazawa et al. | |
| 2013/0243924 A1 | 9/2013 | Bhandari et al. | |
| 2014/0044846 A1 | 2/2014 | Grossbier | |
| 2014/0199462 A1 | 7/2014 | Grossbier et al. | |
| 2014/0234525 A1 | 8/2014 | Berglund et al. | |
| 2014/0314943 A1 | 10/2014 | Adden | |
| 2014/0328991 A1 | 11/2014 | Kobayashi et al. | |
| 2014/0377381 A1 | 12/2014 | Brennan et al. | |
| 2015/0017285 A1 | 1/2015 | Stachiw et al. | |
| 2015/0056338 A1 | 2/2015 | Chigurupati et al. | |
| 2015/0110926 A1 | 4/2015 | Joly et al. | |
| 2015/0125589 A1 | 5/2015 | Tsuchiya et al. | |

FOREIGN PATENT DOCUMENTS

| | | |
|---|---|---|
| DE | 3418644 A1 | 11/1985 |
| DE | 9302125 | 5/1998 |
| EP | 59363 B1 | 12/1984 |
| EP | 124254 B1 | 3/1987 |
| EP | 183736 B1 | 7/1990 |
| EP | 417062 B1 | 7/1993 |
| EP | 536612 B1 | 7/1995 |
| EP | 441786 B1 | 10/1995 |
| EP | 766927 A1 | 4/1997 |
| EP | 1022252 A2 | 7/2000 |
| EP | 1051086 B1 | 4/2002 |
| EP | 809942 B1 | 7/2003 |
| EP | 919137 B1 | 9/2003 |
| EP | 1933645 A1 | 6/2008 |
| EP | 2119372 A1 | 11/2009 |
| EP | 2007226 B1 | 7/2010 |
| EP | 2247197 B1 | 11/2012 |
| EP | 2086354 B1 | 8/2013 |
| ES | 2302576 A1 | 7/2008 |
| FR | 2196151 B1 | 10/1975 |
| FR | 2973989 A1 | 10/2012 |
| FR | 3012293 A1 | 5/2015 |
| GB | 312088 A | 5/1930 |
| GB | 713803 A | 8/1954 |
| GB | 1119490 A | 7/1968 |
| GB | 2237720 B2 | 5/1991 |
| GB | 2396793 B | 4/2005 |
| IL | 45392 A1 | 7/1997 |
| JP | 57186460 A | 11/1982 |
| JP | 62166862 A | 7/1987 |
| JP | 10-295319 | * 10/1998 |
| JP | 2004052449 A | 2/2004 |
| JP | 2008289426 A2 | 12/2008 |
| KR | 2007082418 A | 8/2007 |
| KR | 2009105762 A | 10/2009 |
| SU | 1375237 A1 | 2/1988 |
| WO | WO8300081 A1 | 1/1983 |
| WO | WO9216117 A1 | 10/1992 |

(56) References Cited

FOREIGN PATENT DOCUMENTS

| | | |
|---|---|---|
| WO | WO9518546 A1 | 7/1995 |
| WO | WO9617521 A1 | 6/1996 |
| WO | WO9723593 A1 | 7/1997 |
| WO | WO9802051 A1 | 1/1998 |
| WO | WO9918811 A1 | 4/1999 |
| WO | WO03053163 A2 | 7/2003 |
| WO | WO2005086566 A2 | 9/2005 |
| WO | WO2005094615 A1 | 10/2005 |
| WO | WO2007032941 A1 | 3/2007 |
| WO | WO2008096040 A1 | 8/2008 |
| WO | WO2008043054 A3 | 11/2008 |
| WO | WO2009047654 A1 | 4/2009 |
| WO | WO2009116050 A1 | 9/2009 |
| WO | WO2010119282 A1 | 10/2010 |
| WO | WO2012067673 A1 | 5/2012 |
| WO | WO2012093929 A1 | 7/2012 |
| WO | WO2013085858 A2 | 6/2013 |
| WO | WO2014071394 A1 | 5/2014 |
| WO | WO2014127003 A2 | 8/2014 |
| WO | WO2014172483 A1 | 10/2014 |

OTHER PUBLICATIONS

Mary Ellen Kuhn, Strategies for Reducing Sodium in the U.S., Food Technology, May 2010, 34-36, United States.

Barbara Katz & Lu Ann Williams, Salt Reduction Gains Momentum, Food Technology, May 2010, 25-32, United States.

Christopher M. Parry & Johannes Le Coutre, Monkeying Around With Taste, FoodScienceCentral.com, May 5, 2005, United States.

Nathan Gray, Taste Receptors Understanding May Hold Key For Low-Cal Sweeteners: Review, FoodNavigator.Com, Mar. 3, 2011, United States.

Fidel Toldra & Jose M. Barat, Recent Patents for Sodium Reduction in Foods, Jul. 25, 2008, vol. 1, No. 1, Bentham Science Publishers Ltd., United States.

Thomas Hofmann, Chi-Tang Ho & Wilhelm Pickenhagen, Challenges in Taste Research Present Knowledge and Future Implications, American Chemical Society 2004, Nov. 11, 2003, 24 pages.

Jacqueline B. Marcus, R.D., Culinary Applications of Umami, Food Technology, May 2005, p. 24-29, vol. 59, No. 5.

Kikuchi et al. Japanese Patent Application H05-1 03618 1993 Derwent Abstract, 2 pages.

'Rosemary Extract', Archive.org dated Sep. 28, 2004, 1 page.

Akerboom, CA 114 7653, Derwent Abstract, 1983, 8 pages.

Understandingfoodadditives.org, Anti-Caking Agents, archive.org, Aug. 25, 2006, 2 pages.

Lawless, H.T., "The taste of calcium chloride in mixtures with NaCl, surcrose and citric acid," Food Quality and Preference [online], vol. 15, 2003, pp. 83-89.

\* cited by examiner

SALT SUBSTITUTE WITH PLANT TISSUE CARRIER

TECHNICAL FIELD

The present disclosure is related to a salt substitute with an edible plant tissue carrier, and more particularly to a salt substitute with a fruit carrier, a vegetable carrier, or a combination thereof.

BACKGROUND

Salt, or sodium chloride (NaCl), is well known. While salt imparts a desirable flavor to food, too much use can result in long term adverse health risks. Because of the proliferation of salt in prepared foods and other products found in a grocery store, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 10 to 12 g per day to a level of about 6 g per day, which is equivalent to 2400 mg of sodium.

The most recent Dietary Guidelines issued in the U.S. suggest a proposed consumption limit of 2300 mg of sodium per day and the American Heart Association even suggests a more stringent limit of 1500 mg of sodium per day. The Institute of Medicine also recommends a potassium consumption limit of 4,700 mg per day. Typically potassium consumption is less than half of that level.

Because of these and other reasons, there are a variety of salt substitutes in the market. The classical approach to production of salt substitutes involves combining the sodium and potassium salts, or occasionally magnesium salts, in various ratios and adding a wide variety of other additives to this mix. The other additives are generally added to mask or at least partially reduce the generally metallic or bitter taste of potassium that has generally been associated with salt substitutes containing potassium. The processing techniques used to make these products include, among others, simple blending, agglomeration, extrusion cooking, and the like.

Examples of salt substitutes are numerous. One type relates to a salt substitute that includes an inner core of potassium chloride coated with a carrier (e.g., a food additive such as maltodextrin), an inner core of potassium chloride coated with a mixture of carrier and sodium chloride, and an inner core of potassium chloride coated with a mixture of carrier, sodium chloride, and cream of tartar (potassium bitartrate). The process of making these salt substitutes includes coating the potassium chloride with a solution of carrier, carrier and sodium chloride, or a mixture of carrier, sodium chloride, and cream of tartar.

While traditional salt substitutes may be satisfactory in topical applications or for direct application to food just prior to consumption, they easily dissociate in various food processing operations. This dissociation can result in an undesirable taste associated with the individual components (e.g., the metallic taste of potassium chloride). Thus, traditional salt substitutes are often unsatisfactory for processed food applications.

SUMMARY

In a first general aspect, a salt substitute includes an inorganic food-grade salt, an organic food-grade acid as an acidulant, and plant tissue, wherein the inorganic food-grade salt and the organic food-grade acid are dispersed throughout the plant tissue. The salt substitute is a particulate solid.

Implementations of the first general aspect may include one or more of the following features.

The plant tissue may include fruit tissue, vegetable tissue, or a combination thereof. Suitable fruit tissue includes apple tissue, pear tissue, strawberry tissue, banana tissue, grape tissue, tomato tissue, or a combination thereof. Suitable vegetable tissue includes carrot tissue, potato tissue, corn tissue, beet tissue, or a combination thereof.

The organic food-grade acid may be selected from the group consisting of citric acid, tartaric acid, acetic acid, malic acid, fumaric acid, lactic acid, benzoic acid, and any combination, derivative, or source thereof. In some cases, the organic food-grade acid includes citric acid.

The inorganic food-grade salt may be selected from the group consisting of food-grade alkali metal salts and food-grade alkaline earth metal salts. In some cases, the inorganic food-grade salt is a chloride salt. In one example, the inorganic food-grade salt includes potassium chloride. The particulate solid may include sodium salt(s), non-sodium salt(s), or a combination thereof.

The inorganic food-grade salt and the plant tissue may be present in the salt substitute in a weight ratio between about 2:1 and about 1:10. In some cases, the inorganic food-grade salt dispersed throughout the plant tissue is dissociated (e.g., in the form of atoms, ions, or a combination thereof). In certain cases, some of the inorganic food-grade salt is in crystalline form. In one example, crystals of inorganic food-grade salt are present on an exterior of the plant tissue, an interior of the plant tissue, or both.

The salt substitute may be formed by a process including contacting the plant tissue with an aqueous solution including the inorganic food-grade salt and the food-grade acidulant to disperse the inorganic food-grade salt and the food-grade acidulant throughout the plant tissue to yield a wet, infused plant tissue; removing water from the wet, infused plant tissue to yield a dry, infused plant tissue; and reducing the size of the dry, infused plant tissue to yield the particulate solid. The plant tissue may be dried or freeze-dried before contacting the plant tissue with the aqueous solution. The aqueous solution may be a homogenous aqueous solution. In some cases, removing water from the wet, infused plant tissue includes drying the wet, infused plant tissue. In certain cases, reducing the size of the dry, infused plant tissue includes grinding the dry, infused plant tissue.

A salt substitute may include an additive mixed with the particulate solid to yield a particulate solid mixture. In one example, crystalline sodium chloride is mixed as an additive with the particulate solid.

In a second general aspect, preparing a salt substitute includes contacting plant tissue with an aqueous solution including an inorganic food-grade salt and an organic food-grade acid to yield a wet, infused plant tissue; removing water from the wet, infused plant tissue to yield a dry, infused plant tissue, and reducing the size of the dry, infused plant tissue to yield a particulate solid. Contacting the plant tissue with the aqueous solution disperses the inorganic food-grade salt and the organic food-grade acid throughout the plant tissue, and dissociated inorganic food-grade salt is dispersed throughout the dry, infused plant tissue.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
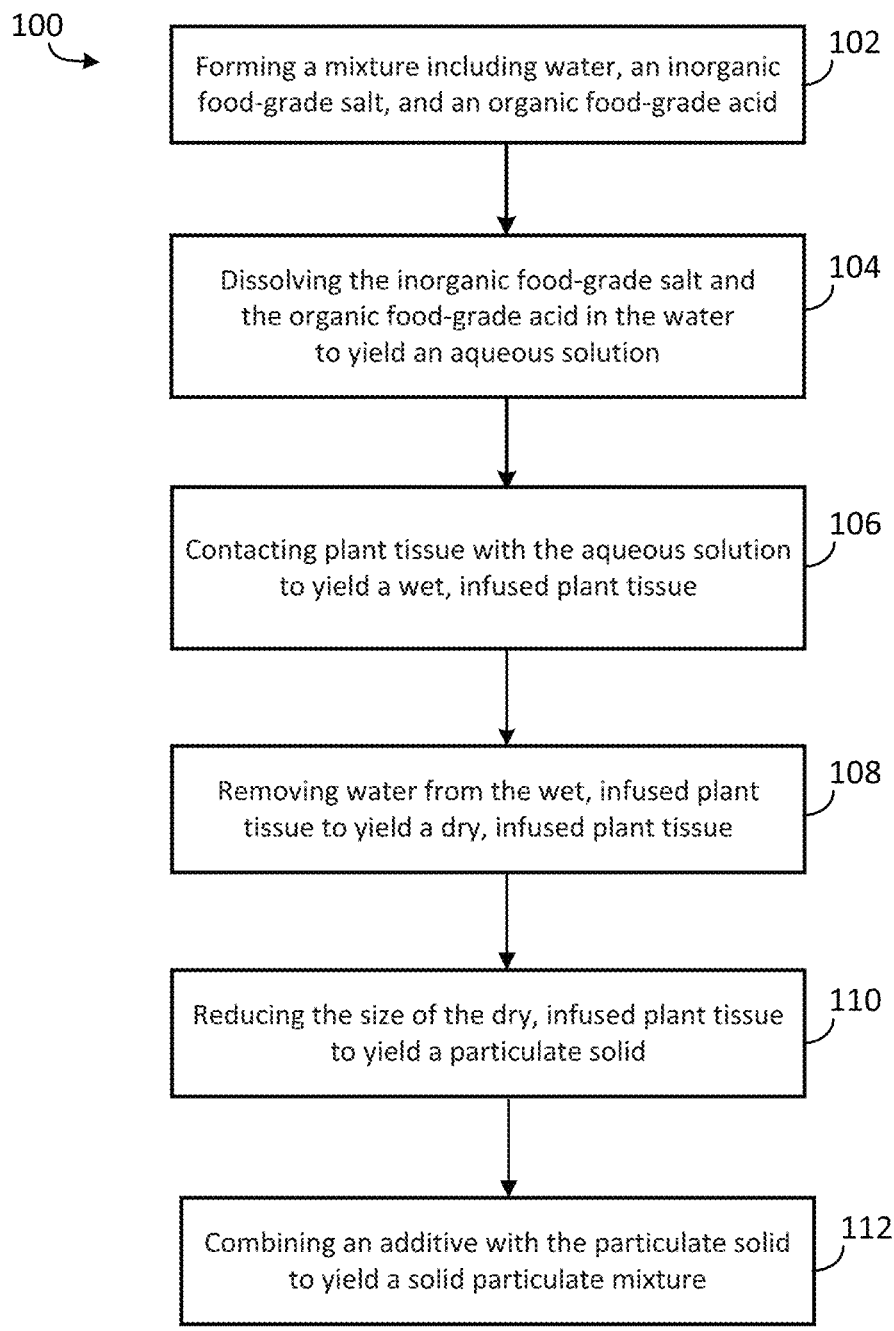
FIG. 1 is a flowchart showing a process for preparing a salt substitute with a plant tissue carrier.

FIG. 1A shows process 100 for preparing a salt substitute using plant tissue (e.g., fruit tissue, vegetable tissue, or a combination thereof) as a carrier for an inorganic food-grade salt. As used herein, "salt," unless modified by another word (e.g., low-sodium salt, reduced-salt, potassium salt, calcium salt, and the like) or used itself to modify another word (e.g., salt substitute, salt composition, and the like), means sodium chloride (NaCl). As used herein, "plant tissue" generally refers to edible plant tissue.

Process 100 includes forming a mixture including water, an inorganic food-grade salt, and a food-grade acidulant (102), and dissolving the inorganic food-grade salt and the food-grade acidulant in the water to yield an aqueous solution (104). The aqueous solution of 104 is typically homogenous. The water in 102 may obtained from any source, and may be treated (e.g., filtered or purified by any other process). The inorganic food-grade salt in 102 may be a food-grade alkali metal salt (e.g., a salt of lithium, sodium, or potassium), a food-grade alkaline earth metal salt (e.g., a salt of magnesium or calcium), or any combination thereof. The salt may be a chloride, a phosphate, a sulfate, or the like, or any combination thereof. In some cases, the inorganic food-grade salt in 102 includes only one or more non-sodium salts (e.g., excludes sodium chloride). The inorganic food-grade salt may be washed or otherwise processed before use. In some cases, the inorganic food-grade salt is a combination of sodium and non-sodium salts (e.g., potassium chloride and sodium chloride) or a combination of two or more non-sodium salts. The inorganic food-grade salt may be supplemented with one or more non-metal salts, such as ammonium chloride.

The food-grade acidulant in 102 may be any compound that increases the relative solubility of the inorganic food-grade salt in water (e.g., by promoting dissolution), and acidifies the mixture, such that a pH of the aqueous solution less than about 7, less than about 6, less than about 5, less than about 4, less than about 3, less than about 2, or less than about 1, or in a range between about 3 and about 4. In general, the taste of sodium chloride is not significantly altered by the food-grade acidulant. The food-grade acidulant, by itself or in combination with the plant tissue, masks the bitter or metallic off flavor associated with non-sodium salts. Suitable food-grade acidulants include organic food-grade acids, such as citric acid, tartaric acid, acetic acid, malic acid, fumaric acid, lactic acid, benzoic acid, and any derivative thereof. In some cases, the food-grade acidulant includes or is obtained or derived from a natural source, such as lemon juice or the like.

Forming the mixture in 102 typically includes mixing from about 60 wt % to about 80 wt % water, from about 15 wt % to about 45 wt % inorganic food-grade salt, and from about 0.1 wt % to about 3 wt % food-grade acidulant. In one example, the mixture in 102 includes about 70 wt % water, about 29 wt % potassium chloride, and about 1 wt % citric acid.

Dissolving the inorganic food-grade salt and the food-grade acidulant in the water to yield the aqueous solution of 104 may include heating the mixture. The aqueous solution may be saturated with respect to the inorganic food-grade salt. The food-grade acidulant may promote dissolution of the inorganic food-grade salt in the aqueous solution, facilitate binding of the inorganic food-grade salt to the plant tissue, reduce the bitterness and off-flavors associated with non-sodium salts, or a combination thereof. In one example, the mixture is heated to a temperature of at least 90° C. or 100° C. Typically, the inorganic food-grade salt, food-grade acidulant, and water are mixed for a time sufficient to dissolve the inorganic food-grade salt. In another example, the inorganic food-grade salt and food-grade acidulant are added to a mixing vessel containing water at a temperature of from about 65° C. to about 105° C. (e.g., around 90° C.). The mixing vessel may be any suitable vessel having a means of agitation.

In 106, plant tissue is contacted with the aqueous solution to yield a wet, infused plant tissue. In 108, water is removed from the wet, infused plant tissue to yield a dry, infused plant tissue. In 110, the size of dry, infused plant tissue is reduced to yield a particulate solid. The particulate solid is suitable for use as a salt substitute for food. In 112, an additive may be combined with the particulate solid.

Plant tissue in 106 includes, but is not limited to, fruit tissue, vegetable tissue, or a combination thereof. In some cases, the plant tissue is fruit tissue, such as that from apples, pears, bananas, strawberries, and the like. In certain cases, the plant tissue is a vegetable tissue, such as that from carrots, potatoes, beets, corn, and the like. The plant tissue is typically dried before it is contacted with the aqueous solution. The plant tissue may be dried by any process, such as drying with heat or forced air, or freeze-drying. The water content of the plant tissue before it is contacted with the aqueous solution is typically 10 wt % or less or 5 wt % or less. The plant tissue may be cut or chopped before it is contacted with the aqueous solution, thereby facilitating infusion of the aqueous solution into the plant tissue. The plant tissue may be in the form of chunks, slices, pieces, or pellets. The volume of the plant tissue may be in a range between 0.1 cm$^3$ to 100 cm$^3$ (e.g., 1 cm$^3$ to 20 cm$^3$, or about 0.5 to 1.5 cubic inches).

Contacting the plant tissue with the aqueous solution in 106 may include soaking or immersing the plant tissue in the aqueous solution. The weight ratio of the plant tissue to the aqueous solution may be in a range between about 1:1 and about 1:10 (e.g., between about 1:2 and about 1.8, between about 1.3 and about 1.7, between about 1.4 and about 1.6, or about 1:5). The weight ratio of the inorganic food-grade salt to the plant tissue may be in a range between about 2:1 and about 1:10 (e.g., between about 2:1 and about 1:2, between about 1.5:1 and about 1:1.5, or about 1:1). The plant tissue may be contacted with the aqueous solution for a length of time sufficient to allow the plant tissue to become saturated with the aqueous solution. In one example, the plant tissue is contacted with the aqueous solution for a length of time in a range between 5 minutes and 1 hour. The aqueous solution may be heated before or during contact with the plant tissue. In some cases, additional heat is applied to the aqueous solution while it is in contact with the plant tissue to facilitate maximum absorption of the aqueous solution by the plant tissue. In certain cases, the aqueous solution is essentially completely absorbed by the plant tissue, such that there is no unabsorbed solution to discard.

Infusing the plant tissue with the aqueous solution includes dispersing the inorganic food-grade salt in ionic form and the food-grade acidulant throughout the plant tissue. The inorganic food-grade salt in the aqueous solution is generally in the form of atoms, ions, or a combination thereof, such that infusing the plant tissue with aqueous solution disperses the inorganic food-grade salt in the form of atoms, ions, or a combination thereof throughout the plant tissue.

Removing water from the wet, infused plant tissue in 108 includes evaporating water from the infused plant tissue. Evaporating water from the infused plant tissue may be achieved by heating the wet, infused plant tissue. Heating the wet, infused plant tissue may be accomplished by a variety of methods, including heating with forced air, vacuum drying, freeze drying, or any drying process generally known in the art. In one example, removing water from the wet, infused plant tissue includes drying the wet, infused plant tissue in a fluid bed dryer. The dry, infused plant tissue typically has a water content between about 1 wt % and about 10 wt %.

Reducing the size of the dry, infused plant tissue in 110 may include chopping, grinding, comminuting, or any other process generally known to reduce the size of plant tissue to yield a particulate solid. The particulate solid may be powdered or granular. The dissociated inorganic food-grade salt and the food-grade acidulant are dispersed throughout the plant tissue in the particulate solid. The dissociated inorganic food-grade salt dispersed throughout the plant tissue is generally understood to be bound to the plant tissue, and is present in the form atoms, ions, or a combination thereof. In some cases, the inorganic food-grade salt in crystalline form is present in or on the plant tissue, together with the dissociated inorganic food-grade salt dispersed throughout the plant tissue. The particulate solid of 110 is suitable for use as a low-sodium salt or salt substitute. The particulate solid may include between about 10 wt % and about 90 wt % inorganic food-grade salt (e.g., between about 35 wt % and about 65 wt % inorganic food-grade salt). In some cases, the particulate solid includes about an equal weight of inorganic food-grade salt and plant tissue.

A size of the particles of the particulate solid may be in a range similar to that of commercially available sodium chloride (e.g., between about +20 mesh and about −200 mesh).

In 112, one or more additives may be combined with the particulate solid of 110. An additive may be selected to improve physical or organoleptic properties of the particulate solid. An additive may be "natural." As used herein, "natural" generally refers to a substance that is not produced synthetically. Suitable additives include anti-caking agents to improve flow of the particulate solid, flavorings, antioxidants to reduce the rancidity of the salted products when cooked, phosphates to tenderize the salted food product, colorants to give the particulate solid a distinct color, or any combination thereof. An example of an anti-caking agent is silicon dioxide. Silicon dioxide may be added in an amount between about 0.1 wt % and about 1 wt % (e.g., about 0.5 wt %) of the particulate solid. Examples of antioxidants include rosemary extract, butylated hydroxytoluene, butylated hydroxyanisole, tocopherols, and the like. Suitable phosphates include monosodium phosphate, tetrasodium pyrophosphate, sodium hexametaphosphate, monopotassium phosphate, tetrapotassium pyrophosphate, disodium phosphate, sodium tripolyphosphate, sodium acid pyrophosphate, dipotassium phosphate, potassium tripolyphosphate, and the like. Examples of natural colorants include caramel color, turmeric, annatto, beta-carotene, paprika oleoresin, red cabbage juice, beet juice, grape skin extract, carmine, and the like. In some cases, an antioxidant may also act as a colorant.

One example of an additive is sodium chloride. The sodium chloride may be combined with the particulate solid in a weight ratio of sodium chloride to the particulate solid between about 9:1 and about 1:9. The mixing or blending of the particulate solid and sodium chloride may be conducted in any suitable vessel. After the particulate solid and the sodium chloride are mixed to yield a dry mixture, the dry mixture may be ground or milled to a desired particle size with any suitable grinder or mill.

The sodium chloride may be obtained from any source. In some cases, the sodium chloride is sea salt. Adding sodium chloride to the particulate solid allows the sodium chloride to remain in its natural, unaltered state. By ensuring that the sodium chloride remain in its natural state, it is believed that the saltiness and flavor associated with sodium chloride will not be altered. As such, the salt substitute described herein may include both sodium chloride and the particulate solid including plant tissue, and provides the saltiness, taste, and appearance of a composition that includes only sodium chloride with a reduced sodium content. For a salt substitute that includes sodium chloride and one or more other inorganic food-grade salts, the weight ratio of sodium chloride to the total weight of the one or more other inorganic food-grade salts is typically in a range between about 1:9 and about 9:1. In one example, the weight ratio of sodium chloride to potassium chloride in a salt substitute is about 1:1.

In some cases, one or more of the operations in FIG. 1 may be omitted. That is, one or more of the operations in FIG. 1 may be optional. In one example, 112 is omitted. In certain cases, one or more of the operations depicted in FIG. 1 is replaced or combined with another operation, the order of one or more the operations is interchanged, two or more operations occur simultaneously or continuously, an additional operation is added, or any combination thereof.

As described herein, a salt substitute may include the particulate solid of 110 or the solid particulate mixture of 112. The salt substitute may include about 0 wt % to about 90 wt % by weight sodium chloride, about 2.5 wt % to about 80 wt % total other inorganic food-grade salt present in the form of atoms, dissociated ions, or a combination thereof, from about 1 wt % to about 75 wt % plant tissue, and from about 0.1 wt % to about 5 wt % by food-grade acidulant. In some cases, a salt substitute includes sodium chloride and one or more other inorganic food-grade salts, with the weight ratio of sodium chloride to the total weight of the one or more other inorganic food-grade salts is typically in a range between about 1:9 and about 9:1. In one example, the weight ratio of sodium chloride to potassium chloride in a salt substitute is about 1:1.

The salt substitute described herein may be used as a substitute for salt (i.e., sodium chloride), or in addition to or to be blended with sodium chloride. The salt substitute described herein may be used in a variety of applications as table salt, inclusion in processed foods such as snack foods, baked goods, to season meats and poultries, and for other food items that have included salt.

The following example provides an illustration of process 100.

EXAMPLES

Carrot as a Carrier.

In a 1 L beaker, 500 mL of filtered water was combined with 172.5 g of potassium chloride and 3.72 g of citric acid.

This mixture was heated to 105° C. with stirring on a hot plate until all of the potassium chloride was dissolved, yielding a homogeneous solution. 150 g of air-dried carrot pieces was added to the homogenous solution at a temperature of 105° C. This mixture was stirred for 30 minutes in the absence of additional heat. All of the homogenous solution was not absorbed by the carrot pieces. The mixture was then heated to about 90° C. for an additional 30 minutes to effect complete absorption. The wet, infused carrot pieces were added to a fluid bed dryer and dried for 45 minutes at 120° C. The weight of the dry, infused carrot pieces was 260 g (some solids were lost during drying, carried by air). The dry, infused carrot pieces were collected and stored in plastic bags.

Figure 2A:
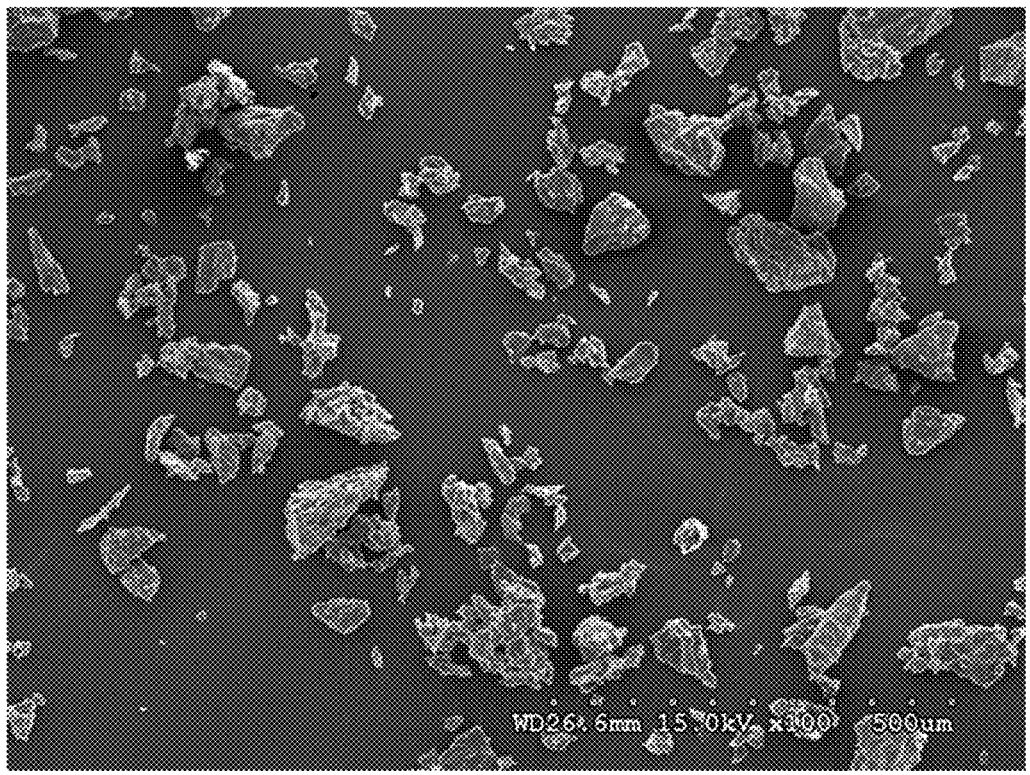
FIG. 2A is a SEM image (100×) of dried, ground carrot.
Figure 2B:
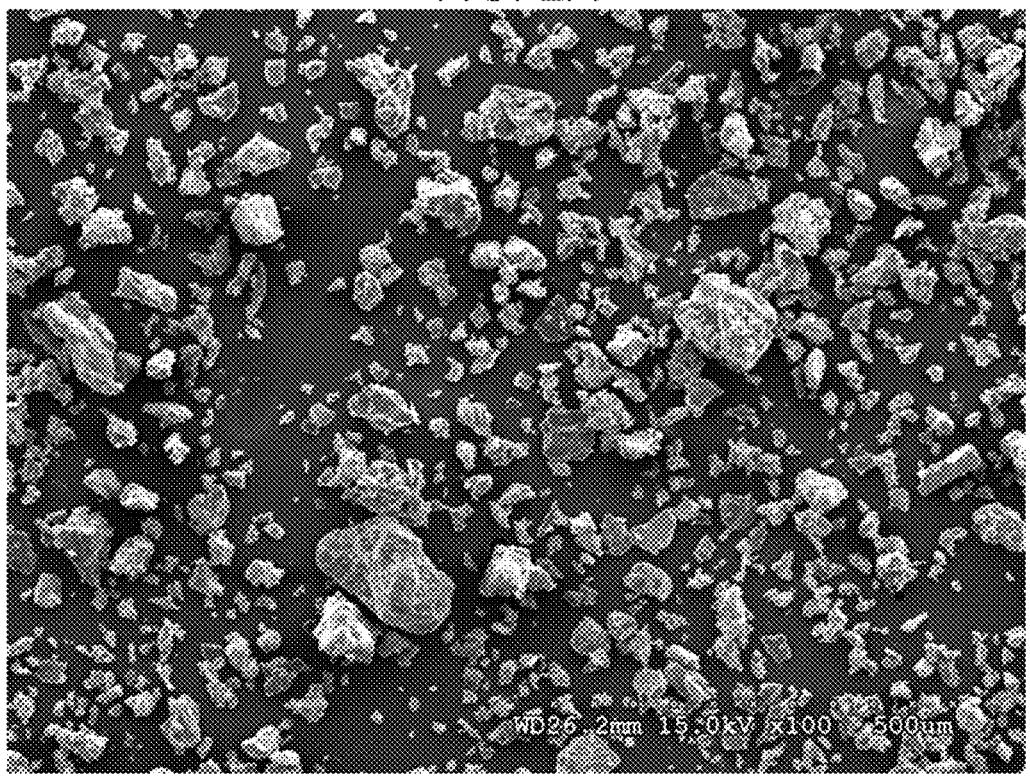
FIG. 2B is a SEM image (100×) of a salt substitute with dried carrot as a carrier.
Figure 3A:
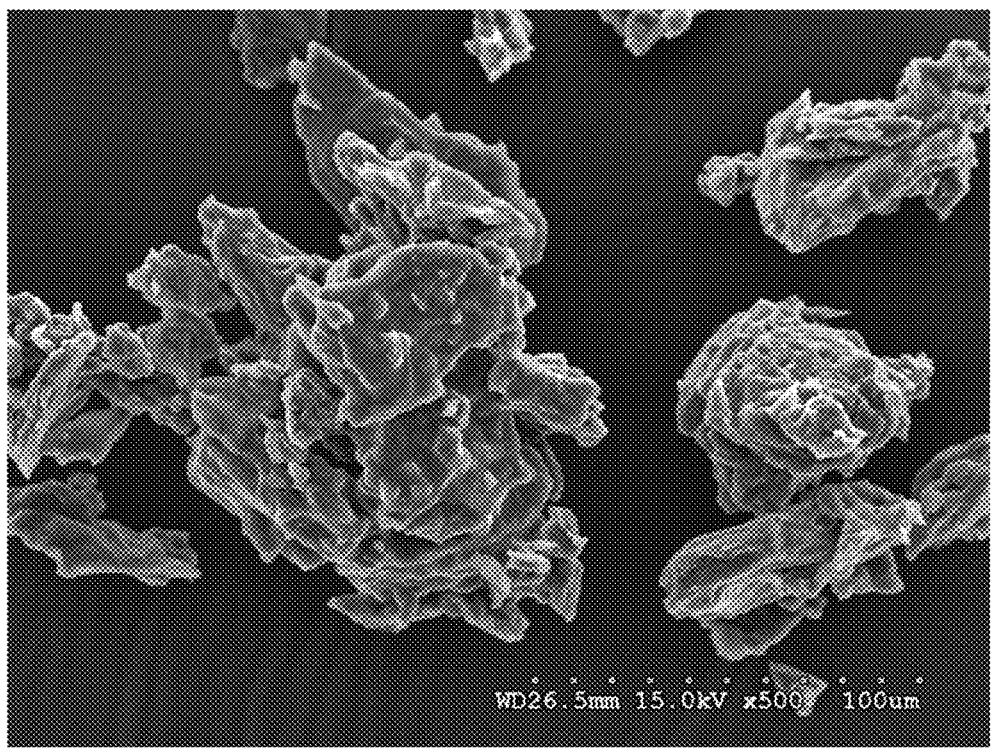
FIG. 3A is a SEM image (500×) of dried, ground carrot.
Figure 3B:
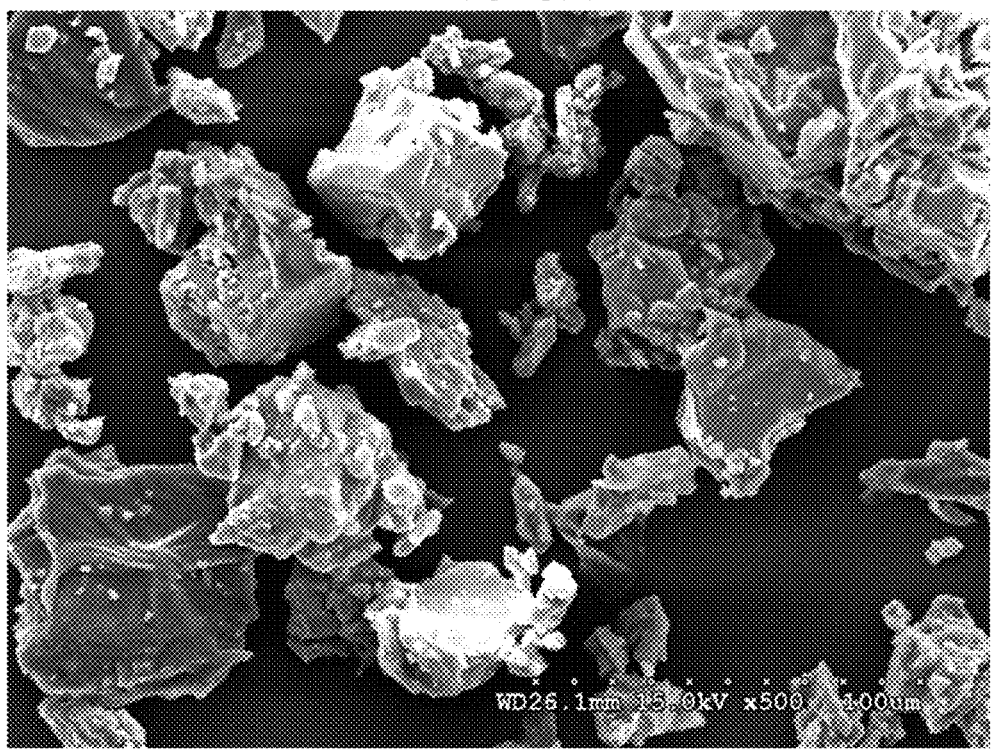
FIG. 3B is a SEM image (500×) of a salt substitute with dried carrot as a carrier.
Figure 4A:
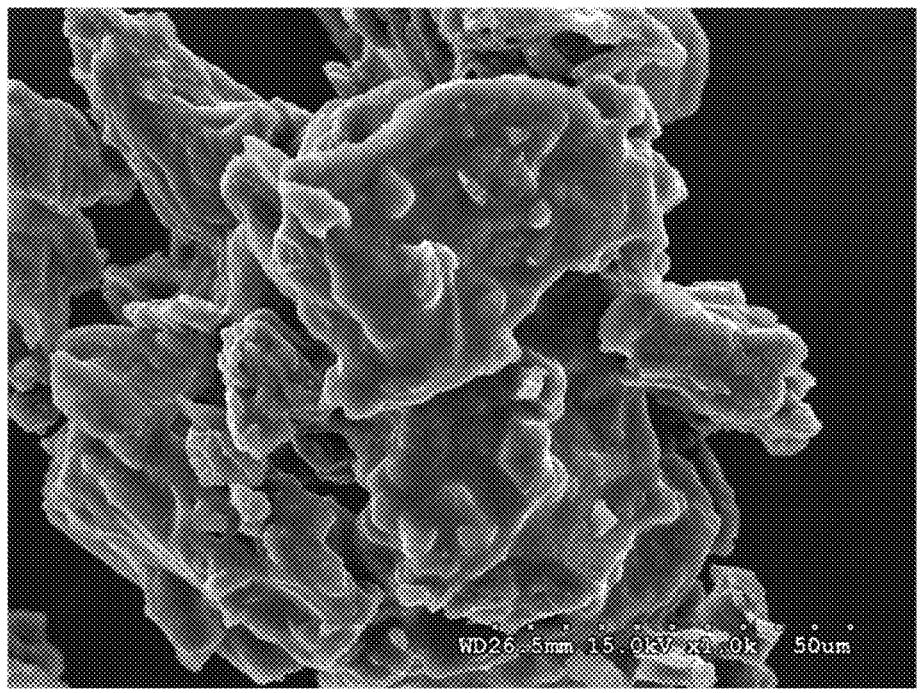
FIG. 4A is a SEM image (1000×) of dried, ground carrot.
Figure 4B:
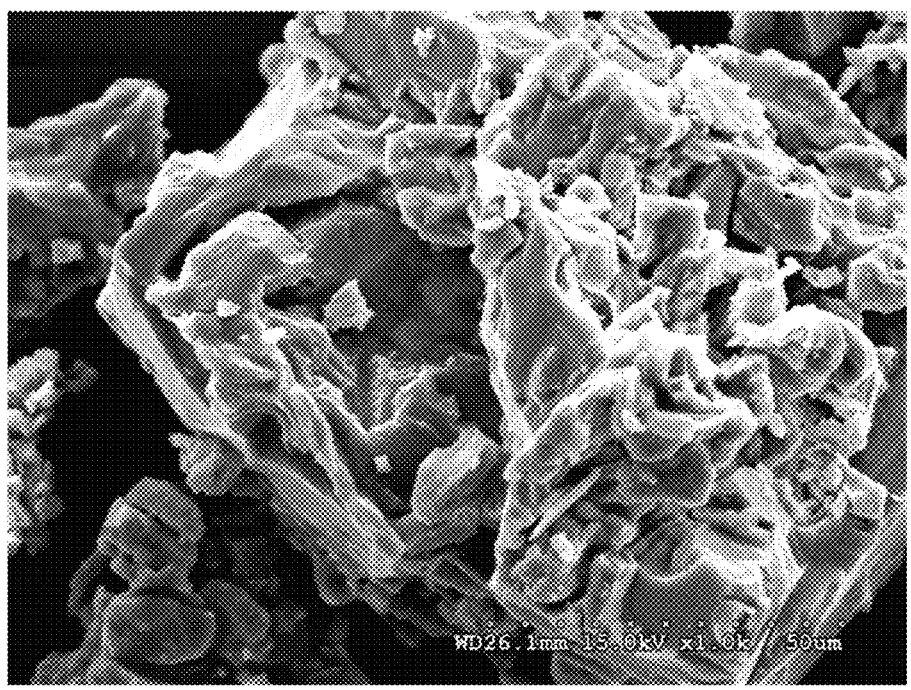
FIG. 4B is a SEM image (1000×) of a salt substitute with dried carrot as a carrier.

Some of the dry, infused carrot pieces were ground in a blender and analyzed for pH, surface morphology, salt content, and sensory attributes. FIGS. 2A, 3A, and 4A show SEM images of ground, air-dried carrot 200 (magnification of 100×, 500×, and 1000×, respectively) that was not infused with the homogenous solution. FIGS. 2B, 3B, and 4B show SEM images of ground, air-dried carrot 300 (magnification of 100×, 500×, and 1000×, respectively) that was infused with the homogenous solution, dried, and ground. The chloride content was measured by titration. Based upon the measured chloride content, the content of potassium and chloride in the ground particulate solid was 54.49 wt %. The pH of an aqueous solution with 10 wt % of the ground particulate solid was 3.81.

Apple as a Carrier.

In a 1 L beaker, 500 mL of filtered water was combined with 172.5 g of potassium chloride and 3.72 g of citric acid. This mixture was heated to 105° C. with stirring on a hot plate until all of the potassium chloride was dissolved, yielding a homogeneous solution. 150 g of freeze-dried apple pieces was added to the homogenous solution at a temperature of 105° C. This mixture was stirred for 30 minutes in the absence of additional heat. All of the homogenous solution was absorbed by the apple pieces. The wet, infused apple pieces were added to a fluid bed dryer and dried for 45 minutes at 120° C. The weight of the dry, infused apple pieces was 260 g. Some solids were lost during drying, carried by air. This loss can be corrected in a commercial setting. The dry, infused apple pieces were collected and stored in plastic bags.

Figure 5A:
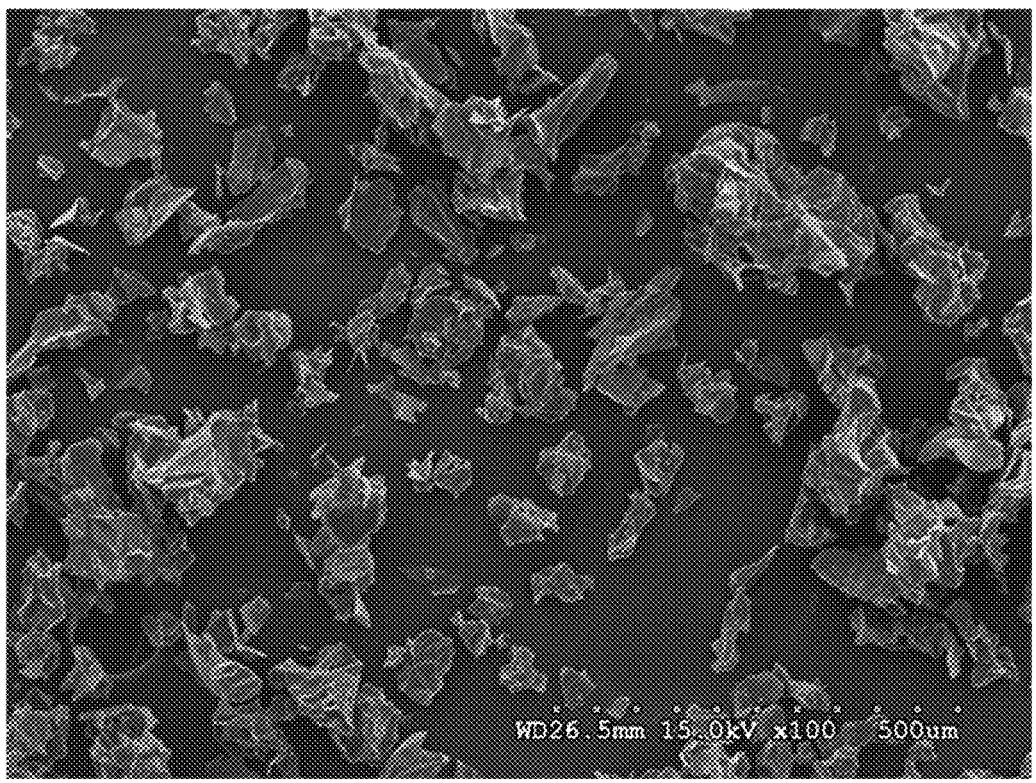
FIG. 5A is a scanning electron microscope (SEM) image (100×) of dried, ground apple.
Figure 5B:
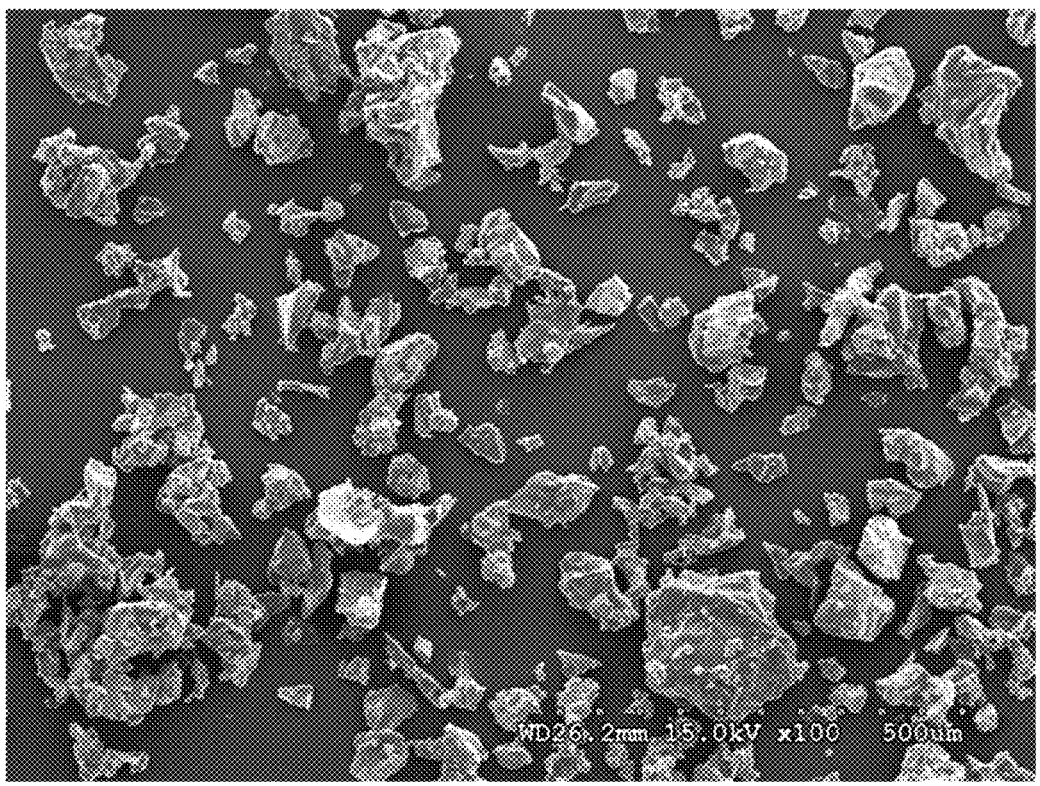
FIG. 5B is a SEM image (100×) of a salt substitute with dried apple as a carrier.
Figure 6A:
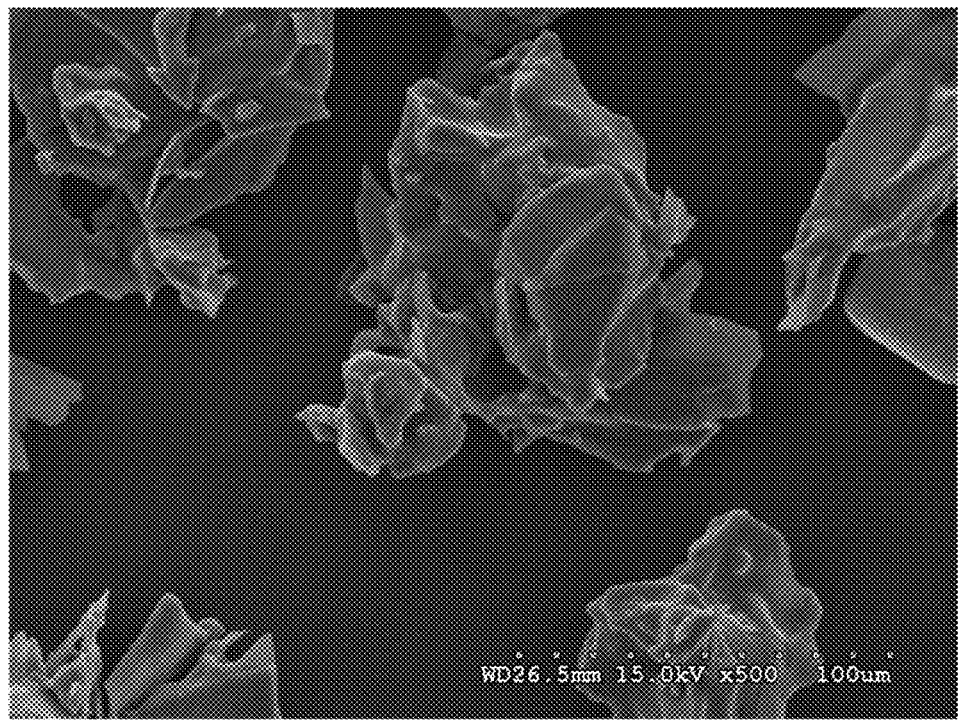
FIG. 6A is a SEM image (500×) of dried, ground apple.
Figure 6B:
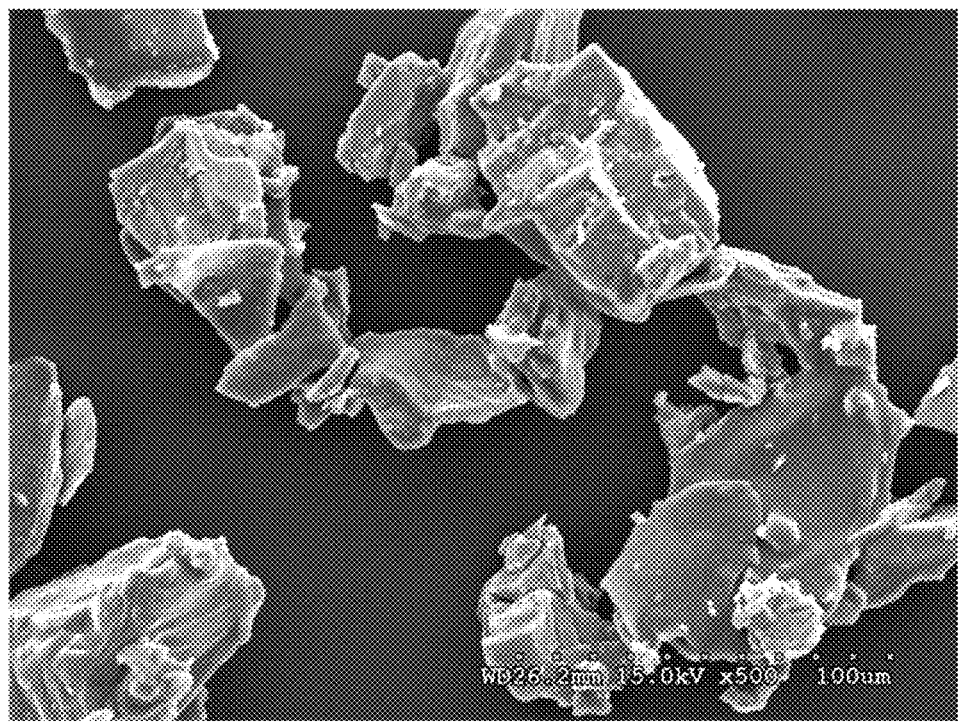
FIG. 6B is a SEM image (500×) of a salt substitute with dried apple as a carrier.
Figure 7A:
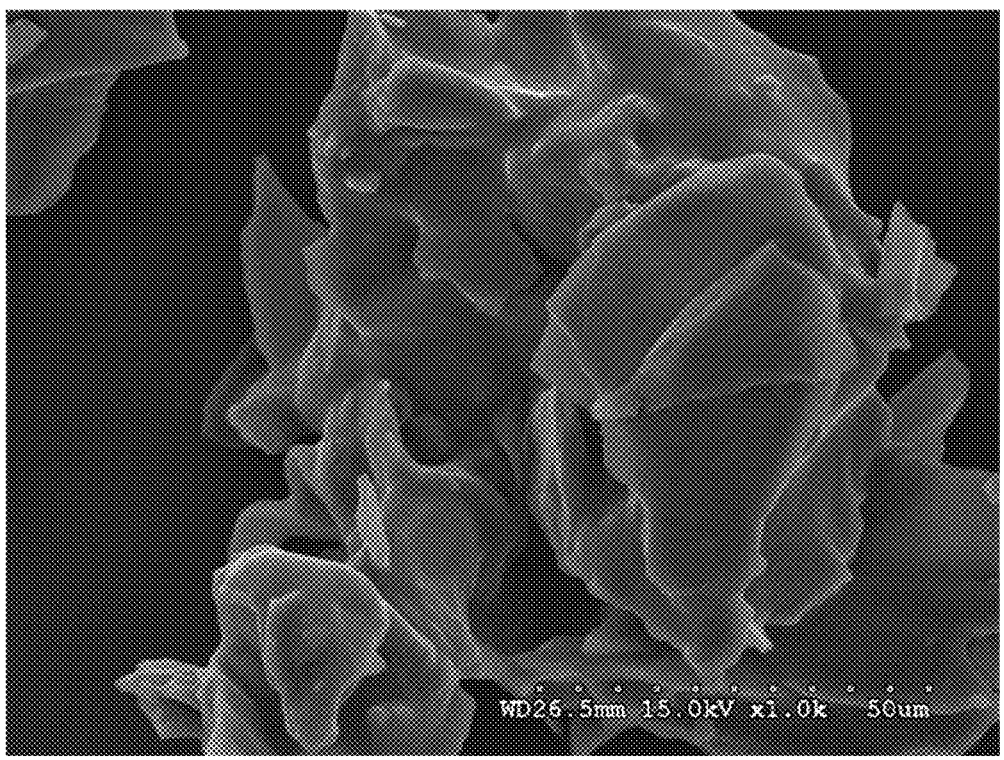
FIG. 7A is a SEM image (1000×) of dried, ground apple.
Figure 7B:
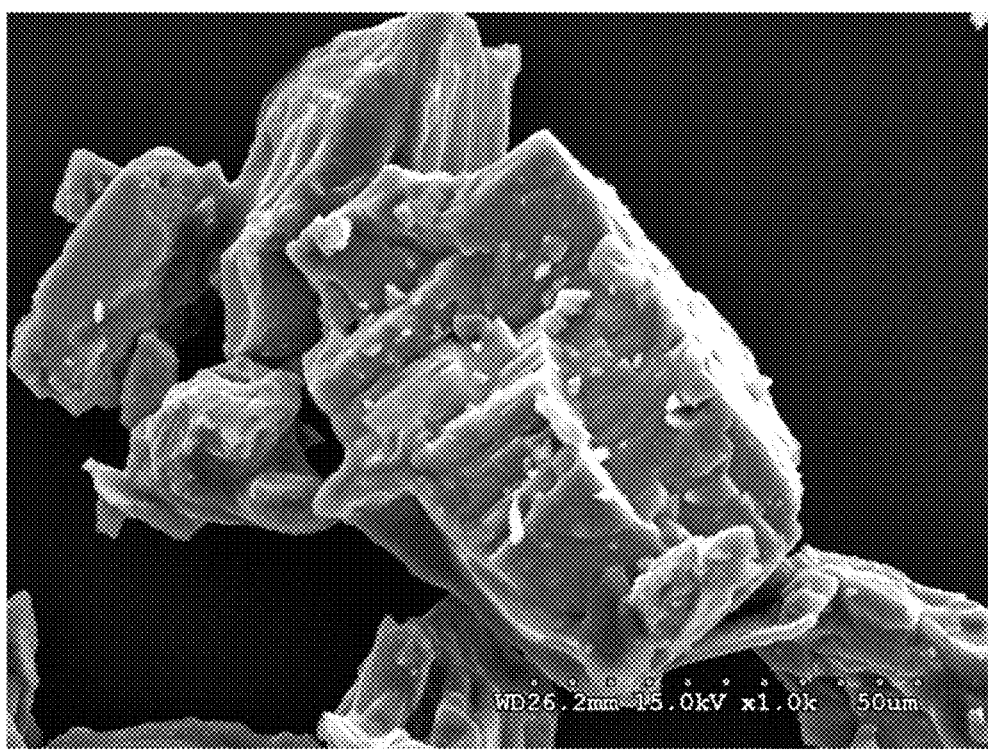
FIG. 7B is a SEM image (1000×) of a salt substitute with dried apple as a carrier.

Some of the dry, infused apple pieces were ground in a blender and analyzed for pH, surface morphology, salt content, and sensory attributes. FIGS. 5A, 6A, and 7A show SEM images of ground, freeze-dried apple 500 (magnification of 100×, 500×, and 1000×, respectively) that was not infused with the homogenous solution. FIGS. 5B, 6B, and 7B show SEM images of ground, freeze-dried apple 600 (magnification of 100×, 500×, and 1000×, respectively) that was infused with the homogenous solution, dried, and ground. The chloride content was measured by titration. Based upon the measured chloride content, the content of potassium and chloride in the ground particulate solid was 62.8 wt %. The pH of an aqueous solution including 10 wt % of the ground particulate solid was 3.42.

Sensory Attributes.

No-salt potato chips from Hy-Vee (Omaha, Nebr.) were heated in an oven at about 80° C. for 10 minutes. The warm chips were then coated with various salt compositions in a mixing bowl by sprinkling the salt composition on the warm chips while tossing and mixing the chips. Chips coated with the salt composition were then collected on plates. Chips coated with different salt compositions were prepared and rated for saltiness, flavor and overall liking on a scale of 1 to 10 by several panelists in a blind taste test. A rating of 10 indicates maximum saltiness, flavor and overall liking. Scores collected from individual panelists were collected and compiled. Averaged values are listed in Table 1.

Table 1 includes average values of saltiness, flavor, and overall liking for the no-salt potation chips with four different salt compositions. A first sample includes 1.5 wt % of the salt substitute composition prepared as described in Example 1 above and 0.75 wt % sodium chloride (ALBERGER flake salt). A second sample includes 1.5 wt % of the salt substitute prepared as described in Example 2 above and 0.75 wt % sodium chloride (ALBERGER flake salt). A third sample (positive control) includes 1.5 wt % sodium chloride (ALBERGER flake salt). A fourth sample (negative control) includes 0.75 wt % sodium chloride (ALBERGER flake salt). As seen in Table 1, the salt substitute prepared as described in Example 2 (apple carrier) received the highest overall scores, exceeding the scores of the positive control. The salt substitute prepared as described in Example 1 (carrot carrier) received the lowest overall scores, below the scores of the negative control.

TABLE 1

Saltiness, flavor, and overall liking of salt substitutes and regular salt.

| Sample | Saltiness | Flavor | Overall Liking |
|---|---|---|---|
| Example 1 (1.5 wt %) + ALBERGER (0.75 wt %) | 6.57 | 6.71 | 6.57 |
| Example 2 (1.5 wt %) + ALBERGER (0.75 wt %) | 7.57 | 7.79 | 7.96 |
| Positive control, ALBERGER (1.5 wt %) | 7.36 | 7.43 | 7.61 |
| Negative control, ALBERGER (0.75 wt %) | 6.57 | 6.86 | 7.00 |

The sample with 1.5 wt % of salt substitute with carrot as a carrier (Example 1) included 0.82 wt % potassium chloride (0.5449×1.5 wt %) and 0.75 wt % sodium chloride. The sample with 1.5 wt % of salt substitute with apple as a carrier (Example 2) included 0.94 wt % potassium chloride (0.628× 1.5 wt %) and 0.75 wt % sodium chloride. Thus, a sensory profile equal or superior to the positive control (1.5 wt % sodium chloride) is obtained with a 50% reduction in sodium content, using apple as a carrier.

A number of embodiments have been described. Nevertheless, it will be understood that various modifications may be made without departing from the spirit and scope of the disclosure. Accordingly, other embodiments are within the scope of the following claims.

What is claimed is:

1. A salt substitute comprising:
    an inorganic food-grade salt;
    an organic food-grade acid as an acidulant; and
    dried plant tissue, wherein the inorganic food-grade salt and the organic food-grade acid are dispersed throughout the dried plant tissue,
    wherein the salt substitute is a particulate solid formed by a process comprising:
        contacting the dried plant tissue with an aqueous solution comprising the inorganic food-grade salt and the food-grade acidulant to disperse the inorganic food-grade salt and the food-grade acidulant throughout the dried plant tissue to yield a wet, infused plant tissue;
        removing water from the wet, infused plant tissue to yield a dry, infused plant tissue; and
        reducing the size of the dry, infused plant tissue to yield the particulate solid.

2. The salt substitute of claim 1, wherein the dried plant tissue comprises dried fruit tissue, dried vegetable tissue, or a combination thereof.

3. The salt substitute of claim 2, wherein the dried plant tissue comprises dried fruit tissue, and the dried fruit tissue comprises dried apple tissue.

4. The salt substitute of claim 2, wherein the dried plant tissue comprises dried vegetable tissue, and the dried vegetable tissue comprises dried carrot tissue.

5. The salt substitute of claim 1, wherein the organic food-grade acid is selected from the group consisting of citric acid, tartaric acid, acetic acid, malic acid, fumaric acid, lactic acid, benzoic acid, and any combination, derivative, or source thereof.

6. The salt substitute of claim 5, wherein the organic food-grade acid comprises citric acid.

7. The salt substitute of claim 1, wherein the inorganic food-grade salt is selected from the group consisting of food-grade alkali metal salts and food-grade alkaline earth metal salts.

8. The salt substitute of claim 1, wherein the inorganic food-grade salt is a chloride salt.

9. The salt substitute of claim 8, wherein the inorganic food-grade salt comprises potassium chloride.

10. The salt substitute of claim 1, wherein the inorganic food-grade salt and the plant tissue are present in the salt substitute in a weight ratio between about 2:1 and about 1:10.

11. The salt substitute of claim 1, wherein the inorganic food-grade salt dispersed throughout the plant tissue is dissociated.

12. The salt substitute of claim 1, wherein some of the inorganic food-grade salt is in crystalline form.

13. The salt substitute of claim 1, further comprising crystalline sodium chloride mixed with the particulate solid.

14. The salt substitute of claim 1, wherein the dried plant tissue is freeze-dried.

15. The salt substitute of claim 1, wherein the aqueous solution is a homogenous aqueous solution.

16. The salt substitute of claim 1, wherein reducing the size of the dry, infused plant tissue comprises grinding the dry, infused plant tissue.

17. A method of preparing a salt substitute, the method comprising:
    contacting dried plant tissue with an aqueous solution comprising an inorganic food-grade salt and an organic food-grade acid, thereby dispersing the inorganic food-grade salt and the organic food-grade acid throughout the dried plant tissue to yield a wet, infused plant tissue;
    removing water from the wet, infused plant tissue to yield a dry, infused plant tissue, wherein the dry, infused plant tissue comprises dissociated inorganic food-grade salt dispersed throughout the dry, infused plant tissue; and
    reducing the size of the dry, infused plant tissue to yield a particulate solid.

18. The method of claim 17, wherein the dried plant tissue is freeze-dried.

19. A salt substitute comprising:
    an inorganic food-grade salt;
    an organic food-grade acid as an acidulant; and
    dried plant tissue, wherein the inorganic food-grade salt and the organic food-grade acid are dispersed throughout the dried plant tissue,
    wherein the salt substitute is a particulate solid, and the inorganic food-grade salt and the plant tissue are present in the salt substitute in a weight ratio between about 2:1 and about 1:10.

* * * * *